Patented Aug. 22, 1950

2,519,879

UNITED STATES PATENT OFFICE 2,519,879

METHOD FOR PREPARING ALKYL-FLUOROSILANES

Ben A. Bluestein, Schenectady, N. Y., assignor to General Electric Company, a corporation of New York No Drawing. Application January 22, 1948, Serial No. 3,811

3 Claims. (Cl. 260—448.2)

This invention is concerned with the preparation of alkylfluorosilanes. More particularly, the invention relates to a method for preparing an alkyl-substituted fluorosilane which comprises (1) dissolving an alkyl polysiloxane (preferably a lower alkyl polysiloxane) in sulfuric acid and (2) passing gaseous hydrogen fluoride (HF) through the acid solution.

It has been suggested previously that organofluorosilanes may be prepared from organo-substituted polysiloxanes by treatment of the said polysiloxanes with sodium fluoride, [E. A. Flood J. A. C. S. 55, 1735 (1933)], or ammonium fluoride (ibid.), or calcium fluoride [Emeleus and Wilkins, J. Chem. Soc., 454 (1944)].

In all the previous methods for preparing organofluorosilanes in accordance with the above-described procedures, there has been great difficulty in isolating the organofluorosilane. This difficulty has been caused by the fact that there is a deposition of a solid sulfate, for example, calcium sulfate, sodium sulfate, ammonium sulfate, etc., which, in many cases, hinders the recovery of the organofluorosilanes. In addition, because of the formation of an emulsion at the interface between the upper and lower layers, it is often not practical to effect complete separation of the supernatant layer containing the organofluorosilanes. The inability to separate adequately the supernatant layer when using fluoride salts tends to make these methods impractical for isolating higher boiling fluorosilanes, since distillation from concentrated sulfuric acid at the necessarily higher temperatures results in excessive oxidation of the desired compound.

I have now discovered that I am able to obtain alkylfluorosilanes from alkyl-substituted polysiloxanes with greater ease, within relatively shorter periods of time, and in greater yields than has heretofore been possible by dissolving the alkyl polysiloxane in concentrated sulfuric acid, passing gaseous anhydrous hydrogen fluoride through the acid solution, and isolating the alkylfluorosilanes.

The alkyl polysiloxanes, which may be converted to monomeric alkylfluorosilanes, may be considered as polymeric siloxanes having the skeletal structure

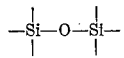

and containing alkyl radicals (for example, methyl, ethyl, propyl, isopropyl, butyl, amyl, etc. radicals) attached directly to the silicon atoms by carbon-silicon linkages. Examples of such polysiloxanes may be mentioned, for instance, polysiloxanes obtained, for example, by the hydrolysis of an alkylhalogenosilane (or mixtures of alkylhalogenosilanes), e. g., a methylhalogenosilane such as pure or substantially pure dialkyl-substituted dichlorosilane, e. g., dimethyldichlorosilane or an alkyl-substituted, e. g., methyl-substituted silane, whose other valences are satisfied by radicals which themselves are readily hydrolyzable, for instance, hydrogen, amino, alkoxy, aroxy, acyloxy, etc., radicals. These are preferably liquid alkyl polysiloxanes which may be simple or complex condensation products containing an average of from 1.90 to 3.0 alkyl groups per silicon atom, and which are soluble in concentrated sulfuric acid.

Thus, hydrolyzed dialkyldihalogenosilanes containing varying mol per cents of monoalkyl-substituted silanes may be hydrolyzed as is more fully disclosed and claimed in Patnode applications Serial Nos. 463,813, now abandoned; 463,814, now U. S. Patent 2,469,888 and 463,815, now abandoned, filed October 29, 1942, and in Wilcox application Serial No. 656,162, filed March 21, 1946, now U. S. Patent 2,491,843, issued December 20, 1949, the foregoing applications being assigned to the same assignee as the present invention.

The liquid alkyl polysiloxane may also take the form of lower molecular weight polysiloxanes, for example, hexamethyldisiloxane (which can be obtained by hydrolysis of trimethylchlorosilane), hexamethylcyclotrisiloxane, etc.

Alkyl polysiloxanes which also contain

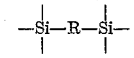

groupings, where R is a lower alkylene radical, e. g., a methylene, ethylene, etc., radical, may also be treated in accordance with my claimed invention to yield alkyl fluorosilanes containing the above groupings. Examples of the aforementioned alkyl polysiloxanes may be found disclosed and taught in Rochow Patent 2,383,817, issued August 28, 1945 and assigned to the same assignee as the present invention.

As will be apparent from the foregoing discussion of the various alkyl polysiloxanes which may be employed in the preparation of the alkylfluorosilanes, my invention is of great practical importance in recovering waste alkyl polysiloxanes in the form of starting materials which can again be employed to prepare these or other, e. g., mixed, alkyl polysiloxanes. It will be apparent to those skilled in the art that my invention is suitable as a means for identifying the number, kind, and disposition of alkyl radicals attached to the silicon atoms of the alkyl polysiloxane, since the alkyl fluorosilanes have readily identifiable properties.

The sulfuric acid employed is preferably concentrated sulfuric acid (in water) having a specific gravity above about 1.81 and containing at least 90 per cent $H_2SO_4$, or may be fuming sulfuric acid. Commercially available sulfuric acid having a specific gravity of about 1.84 and containing approximately 96 per cent sulfuric acid may advantageously be employed. The amount of sulfuric acid used in my claimed process will vary within wide limits depending upon such factors as the type and solubility of the alkyl polysiloxane employed, etc. It is preferable that sufficient concentrated sulfuric acid be employed to dissolve substantially all the alkyl polysiloxane desired to be converted to the alkylfluorosilane.

Although different temperature conditions may be used in the practice of my invention, I prefer to conduct the passage of the anhydrous hydrogen fluoride through the acid solution of the alkyl polysiloxane at room temperatures or even below room temperature, for example, from 0° to 30° C. Higher temperatures, of course, may be employed, e. g., at about 30° to 100° C., or higher, without departing from the scope of my invention.

In order that those skilled in the art may better understand how the present invention may be practiced, the following examples are given by way of illustration and not by way of limitation.

*Example 1*

Diethyldichlorosilane was hydrolyzed in water, washed, and dried to yield polymeric diethylsiloxane. Two 45-gram (0.44 mol) samples of this oil were each dissolved in 100 cc. of concentrated sulfuric acid (sp. gr. 1.84, containing 96 per cent $H_2SO_4$) to yield a clear solution.

Through one of the sulfuric acid solutions of the diethyl polysiloxane was passed a stream of anhydrous gaseous HF for 15 minutes. A supernatant layer appeared almost immediately. When an increase in the volume of this layer was no longer apparent, the reaction was assumed to be complete, and the passage of HF was stopped. The supernatant liquid was separated from the sulfuric acid layer, and fractionally distilled to yield 36 grams (66 per cent yield) of diethyldifluorosilane boiling at 60–64° C.

To the other sulfuric acid solution of the diethyl polysiloxane was added 50 grams (0.64 mol) calcium fluoride (an excess) during a 10-minute period. There was obtained a thick slurry and a supernatant liquid. It was not found possible to separate completely the supernatant liquid because of the formation of an emulsion at the interface and because of the large amount of solid (calcium sulfate) present in the lower layer. Therefore, the reaction mass was distilled directly in the form of a mixture of the solid and liquid to yield 32.6 grams diethyldifluorosilane boiling at 60–65° C. This represents a 59 per cent yield of diethyldifluorosilane.

*Example 2*

In this example, a polymeric reaction product comprising tetramethyl-1,3-bis-(pentamethyldisiloxanylmethyl) disiloxane (or 2,2,4,4,6,6,8,8,10,10,12,12-dodecamethyl-3,7,11-trioxa-2,4,6,8,10,12-hexasilatridecane), which may be prepared in accordance with the method disclosed in my copending application, Serial No. 3,812, now U. S. 2,452,895, issued November 2, 1948, filed concurrently herewith and assigned to the same assignee as the present invention, was dissolved in concentrated sulfuric acid. Thereafter anhydrous HF was passed through the sulfuric acid solution for about 2 hours until no further increase resulted in the volume of the supernatant liquid formed as a result thereof; during this time, large amounts of trimethylfluorosilane were evolved as a gas. Separation of the supernatant liquid and fractional distillation thereof yielded more trimethylfluorosilane, and bis-(fluorodimethylsilyl) methane in a 63 per cent yield. This latter compound has a boiling point of 114–116° C. and a refractive index $n_d^{20}$ 1.3780.

*Example 3*

Trimethylfluorosilane may be obtained from hexamethyldisiloxane by dissolving the latter in about an equal amount of concentrated sulfuric acid and passing anhydrous HF through the solution until no further evidence of reaction is apparent. Trimethylfluorosilane is recovered under normal temperature conditions in the form of a gas in an almost quantitative yield.

What I claim as new and desire to secure by Letters Patent of the United States is:

1. The process for preparing a methylfluorosilane which comprises (1) dissolving a liquid polysiloxane selected from the class consisting of hexamethyldisiloxane and tetramethyl-1,3-bis-(pentamethyldisiloxanylmethyl) disiloxane in concentrated sulfuric acid, (2) passing anhydrous gaseous hydrogen fluoride through the acid solution of the liquid polysiloxane and (3) isolating a methyl fluorosilane from the reaction mixture.

2. The process for preparing bis-(fluorodimethylsilyl) methane corresponding to the formula

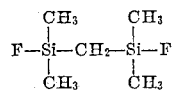

which process comprises (1) dissolving a liquid polysiloxane comprising tetramethyl - 1,3 - bis-(pentamethyldisiloxanylmethyl) disiloxane in concentrated sulfuric acid, (2) passing anhydrous gaseous hydrogen fluoride through the acid solution, and (3) isolating the aforementioned methylfluorosilane.

3. The method of preparing trimethylfluorosilane which comprises (1) dissolving hexamethyldisiloxane in concentrated sulfuric acid, (2) passing anhydrous gaseous hydrogen fluoride through the acid solution, and (3) isolating the formed trimethylfluorosilane.

BEN A. BLUESTEIN.

REFERENCES CITED

The following references are of record in the file of this patent:

UNITED STATES PATENTS

| Number | Name | Date |
| --- | --- | --- |
| 2,436,778 | Pletcher | Feb. 24, 1948 |

OTHER REFERENCES

Burkhard, "Chem. Reviews," vol. 41 (Aug. 1947), page 104.

Flood, "Jour. Am. Chem. Soc.," vol. 55 (1933), pages 1735–1736.

Emeleus, "Jour. Chem. Soc.," (London), 1944, pages 454–456.

Pearlson, "Jour. Am. Chem. Soc.," vol. 67 (1945), pages 1769–1770.

Pray, "Jour. Am. Chem. Soc.," vol. 70 (1948), pages 433–434.

Sommer, Jour. Am. Chem. Soc., vol. 70 (1948), pages 445–447.